(12) United States Patent  (10) Patent No.: US 9,320,075 B2
Wang et al.  (45) Date of Patent: *Apr. 19, 2016

(54) METHOD, SYSTEM AND TRANSMISSION DISTRIBUTION NETWORK ELEMENT FOR INDICATING DATA-DISTRIBUTION

(75) Inventors: Jing Wang, Shenzhen (CN); Na Zhou, Shenzhen (CN); Yuzhen Huo, Shenzhen (CN); Zalfeng Zong, Shenzhen (CN)

(73) Assignee: ZTE Corporation, Guangdong Province (CN)

( * ) Notice: Subject to any disclaimer, the term of this patent is extended or adjusted under 35 U.S.C. 154(b) by 649 days.

This patent is subject to a terminal disclaimer.

(21) Appl. No.: 13/259,779

(22) PCT Filed: Jul. 30, 2010

(86) PCT No.: PCT/CN2010/075609
§ 371 (c)(1),
(2), (4) Date: Feb. 21, 2012

(87) PCT Pub. No.: WO2011/020405
PCT Pub. Date: Feb. 24, 2011

(65) Prior Publication Data
US 2012/0142278 A1 Jun. 7, 2012

(30) Foreign Application Priority Data
Aug. 20, 2009 (CN) .......................... 2009 1 0168452

(51) Int. Cl.
*H04W 36/00* (2009.01)
*H04W 76/04* (2009.01)
(Continued)

(52) U.S. Cl.
CPC ........ *H04W 76/041* (2013.01); *H04W 36/0016* (2013.01); *H04W 76/022* (2013.01); *H04W 36/0033* (2013.01); *H04W 36/12* (2013.01); *H04W 36/22* (2013.01)

(58) Field of Classification Search
CPC .. H04W 24/00; H04W 28/08; H04W 36/0016
USPC .......................................................... 455/453
See application file for complete search history.

(56) References Cited

U.S. PATENT DOCUMENTS

2009/0017864 A1 1/2009 Keevill et al.
2010/0329205 A1* 12/2010 Bi et al. ........................ 370/331
(Continued)

FOREIGN PATENT DOCUMENTS

CN 101278577 A 10/2008
CN 101291529 A 10/2008
(Continued)

OTHER PUBLICATIONS

Extended European Search Report issued in European Application No. 10809538.1 dated Nov. 29, 2013.
(Continued)

*Primary Examiner* — Asghar Bilgrami
(74) *Attorney, Agent, or Firm* — Venable LLP; Jeffri A. Kaminski

(57) ABSTRACT

The present invention provides a method and system for indicating data offload, and a traffic offload network element, the method comprises: when a radio bearer is established or modified, a mobility management unit of a core network notifies a traffic offload network element of the bearer type of the bearer to determine whether to start the data offload. Through the present invention, the judgment operation of the core network is simplified. In addition, under the situation that the core network side determines whether to start local access function, the traffic offload network element also can correctly start an offload policy.

17 Claims, 16 Drawing Sheets

(51) Int. Cl.
*H04W 76/02* (2009.01)
*H04W 36/12* (2009.01)
*H04W 36/22* (2009.01)

(56) References Cited

U.S. PATENT DOCUMENTS

| | | | |
|---|---|---|---|
| 2011/0058479 A1* | 3/2011 | Chowdhury | H04L 45/04 370/237 |
| 2011/0116469 A1* | 5/2011 | Bi | H04W 76/022 370/331 |
| 2012/0057496 A1* | 3/2012 | Jin et al. | 370/252 |

FOREIGN PATENT DOCUMENTS

| | | |
|---|---|---|
| CN | 101299882 A | 11/2008 |
| CN | 101472350 A | 7/2009 |
| CN | 101478743 A | 7/2009 |
| CN | 101511076 A | 8/2009 |
| WO | WO-2008/125729 A1 | 10/2008 |
| WO | WO-2009/082952 A1 | 7/2009 |

OTHER PUBLICATIONS

China Mobile: "Analyzing the NAT and Gn/Gp LIPA Solutions," 3GPP S2-094497, Jun. 30, 2009, pp. 1-3, XP002714759, Retrieved from the Internet: URL:http://www.3gpp.org/ftp/tsg_sa/WG2_Arch_TSG2_74_Sohpia_Antipolis/Docs/ [Retrieved on Oct. 15, 2013].

Qualcomm Europe: "Local IP access baseline solution for EHNB," 3GPP Draft; S2-092308, 3GPP, Mobile Competence Centre; 640 Route Des Lucioles; F-06921 Sophia-Antipolis Cedex; France, no. Hangzhou, Mar. 24, 2009, XP050345597.

Nokia Siemens Networks et al.: "Local GW functionality for LIPA and related control functionality," 3GPP Draft; S2-094574 (Local_IP_Access_GWFunctions&Control)V5 3GPP, Mobile Competence Centre; 640 Route Des Lucioles; F-06921 Sophia-Antipolis Cedex; France, no. Hangzhou, Jun. 30, 2009, XP050356061.

NEC: "Architecture alternative for Local IP access," 3GPP Draft; S2-091989 Local IP Access to Home, 3GPP, Mobile Competence Centre; 640 Route Des Lucioles; F-06921 Sophia-Antipolis Cedex; France, no. Hangzhou, Mar. 24, 2008, XP050345321.

* cited by examiner

METHOD, SYSTEM AND TRANSMISSION DISTRIBUTION NETWORK ELEMENT FOR INDICATING DATA-DISTRIBUTION

FIELD OF THE INVENTION

The present invention relates to the mobile communication technical field, in particular to a method and system for indicating data offload, and a traffic offload network element.

BACKGROUND OF THE INVENTION

In order to maintain the competitiveness of the third-generation mobile communication system in the communication field, the 3rd Generation Partnership Project (3GPP) standard working group is now concentrating on the research of Evolved Packet System (EPS). FIG. 1 shows a schematic diagram of a structure of an evolved packet domain system. As shown in FIG. 1, the entire EPS system is divided into two parts, namely a radio access network and a core network. The core network comprises a Home Subscriber Server (HSS), a Mobility Management Entity (MME), a Serving GPRS Support Node (SGSN), a Policy and Charging Rule Function (PCRF), a Serving Gateway (S-GW), a PDN Gateway (P-GW) and a Packet Data Network. The function of each part is described hereinafter.

The HSS is a site for permanently storing user subscription data and is located in the home network signed by the user.

The MME is a storage site for the user subscription data in the current network, and is responsible for non-access layer signaling management from the terminal to the network, security authentication function of the terminal, mobility management of the terminal, tracking and paging management function in user idle mode, and bearer management.

The SGSN is a service support node for the GERAN and UTRAN user to access the core network, which is similar to the mobility management entity in function, and is responsible for the functions such as user location updating, paging management, bearer management and so on.

The S-GW is a gateway from the core network to the wireless system, and is responsible for user plane bearer from the terminal to the core network, data cache in terminal idle mode, the function of the network side initiating a service request, lawful interception and functions of packet data routing and forwarding; and the S-GW is responsible for counting the situation that the user terminal uses the radio network, producing a call record of the terminal using the radio network and transmitting the call record to the charging gateway.

The P-GW is the gateway of the evolved system and the external packet data network of the system, which is connected to the Internet and the packet data network, and is responsible for functions such as Internet Protocol (IP) address allocation of the terminal, charging function, packet filtering, policy control and so on.

The packet data network is an IP service network of the operator, which provides IP services to the user through the core network of the operator.

The PCRF entity is a server in the evolved system, which is responsible for providing rules on the aspect of policies such as charging control, on-line credit control, threshold control, and Quality of Service (QoS).

A radio access network consists of E-UTRAN NodeBs (eNB) and 3G Radio Network Controllers (RNC), and is mainly responsible for transmitting and receiving radio signals, communicating with the terminal through an air interface, and managing radio resources, resource scheduling and access control of the air interface.

The above mentioned serving GPRS support node is an updated SGSN, which can support the S4 interface between the support node and the serving gateway, and communicate with the mobility management unit by the GTPv2 protocol. And for the SGSN which supports the 3G core network, the PS domain network structure is different from what is shown in FIG. 1. In this case, the SGSN and the MME are connected through the Gn interface, and communicate with each other by the GTPv1 protocol. The SGSN cannot be connected with the serving gateway, but is connected, through a Gn interface, to a Gateway GPRS Support Node (GGSN) to directly carry out packet data network access.

Home NodeB (HNB) or Home eNodeB (HeNB) is a small and low-power type of base station. As exclusive resources for some users, the Home NodeB or Home eNodeB is deployed in private places such as home, organizations, enterprises or schools, mainly serves to provide higher service rate to the users and reduce the costs of using the high rate services, and simultaneously overcome the shortage in coverage of the existing distributed cellular radio communication system. The Home NodeB has the advantages of being affordable and convenient, low-power output, plug and play, broadband access, using single-mode terminal and so on.

The Home NodeB can be applied to the 3G (3rd Generation) or the LTE (Long Term Evolution) mobile communication network. In order to facilitate the management of the Home NodeB, a new network element, namely a Home NodeB gateway, is introduced to the network. The Home NodeB gateway mainly implement the functions of: authenticating security of the Home NodeB, maintaining and managing the operation of the Home NodeB, configuring and controlling the Home NodeB according to the requirements of the operators, being responsible for exchanging data information between the core network and the Home NodeB. FIG. 2 is a 3G Home NodeB network structure diagram. The 3G Home NodeB is connected, through a newly defined Iuh interface, to the Home NodeB gateway, which provides IuPS and IuCs interfaces to the core network packet domain and circuit domain. For the 3G network, the Home NodeB gateway must be deployed so as to shield the influence of the introduction of the Home NodeB on the terminal and network side. While for the LTE network, the Home NodeB gateway is optionally deployed, thus the LTE Home NodeB can be connected to the core network in two manners, one is that the Home NodeB is directly connected to the network elements of the core network, and the other is that the Home NodeB is connected to the network elements of the core network through a gateway, as shown in FIGS. 3 and 4. As to the scene shown in FIG. 4 in which the Home NodeB gateway is introduced, the Home NodeB gateway may not integrate user plane functions, and the user plane is directly established between the Home NodeB and the user plane gateway of the core network, thus the user plane can be flattened and data transmission delay is decreased, as shown in FIG. 5.

The Home NodeB not only supports the access through the mobile core network, but also can support local access function. Under the conditions that the Home NodeB has local accessibility and the user subscription allows local access, local access of a user to other IP devices of home and enterprise networks, the Internet, or other particular networks can be realized. Through the local access function, the data offload services of the Internet or particular networks can be realized, the load of the core network is reduced, and the access to the home network device can be forwarded without the core network, which makes data transmission easy and efficient. The local access function can also be used in the macro cell, and the main use of the local access function in the macro cell is similar to that in the Home NodeB. The local access function is more applied in such scenes as local access to the Internet or to other particular networks in order to reduce the load of the core network. FIG. 6 shows the realization manner of the local access function, taking the Home NodeB scene as an example (flyback in the figure is referred to as Backhaul). The data transmitted by the user to the home network, the Internet and the core network can share a same PDN connection, the offload policy in the Home NodeB accomplishes the selection of the data packet offload path, in this case, the Home NodeB can be referred to as a traffic offload network element. The traffic offload network element is a network element having an offload policy implementing function, which can be deployed at a base station (for example, a Home NodeB, or a macro base station) or at an interface (for example, an Iu or S1 interface) between a base station and a network element of the core network. The existing traffic offload network element can use the corresponding relationship between the target address of data and the offload path selection as an offload policy. The application of this offload policy requires the traffic offload network element to perform address analysis on data packets in each bearer. The current manner in which the traffic offload network element processes data packets is not optimized, and system resources are wasted. In reality, usually only the Internet services require local access. Considering that this kind of service data does not need Qos guarantee, the data transmission can be accomplished just by using a default bearer built by user subscription Qos in the PDN connection or a dedicate bearer of non-GBR, in this case, the offload policy using bearer as granularity is more advantageous.

In addition, under the situation that the local access function of the traffic offload network element is closed or the local access function does not support mobility when the user handovers between base stations, the conventional art only can notify the network element of the core network through a special notification mechanism added by the traffic offload network element to initiate a release of the local access bearer. In the conventional art, local processing cannot be done by the traffic offload network element, which increases the burden of the core network.

In addition, in the scene that the core network side determines whether to activate the local access function, currently, there is no mechanism to notify the traffic offload network element of the state of the local access function of the user, and the traffic offload network element cannot correctly start the offload policy to perform data offload.

SUMMARY OF THE INVENTION

In view of the above mentioned, the present invention provides a method and system for indicating data offload, and a traffic offload network element, so as to solve at least one of the problems in conventional art that the system resources are wasted and are processed incorrectly, and the traffic offload network element cannot process the local access bearer, which is caused by the abnormity in offload policy starting as the traffic offload network element cannot obtain the bearer type.

According to one aspect of the present invention, a method for indicating data offload is provided, which comprises: when a radio bearer is established or modified, a mobility management unit of a core network notifies a traffic offload network element of a bearer type of the bearer to determine whether to start the data offload.

Preferably, the bearer type is configured to indicate whether the bearer is applied in local access.

Preferably, the bearer type indicates whether the bearer is applied in local access through a parameter newly defined or by setting presence or absence of an existing parameter.

Preferably, before the mobility management unit notifies the traffic offload network element of the bearer type of the bearer, the method further comprises: the mobility management unit determines to provide local access function to a user according to the situation of subscription of the user or the situation of network load.

Preferably, after the mobility management unit notifies the traffic offload network element of the bearer type, the method further comprises: the traffic offload network element starts an offload policy for a bearer applied in local access to perform data offload; and the traffic offload network element transmits data on a bear which is not applied in local access to the core network.

Preferably, the traffic offload network element is located at a base station or at an interface between a base station and a network element of the core network.

Preferably, the offload policy comprises at least one of the following: offload according to the present bearer, offload according to target address to which data is transmitted, and offload according to service type.

Preferably, the local access comprises: local access of a user to other network protocol IP devices of home and enterprise networks, the Internet network, or other particular networks.

Preferably, under the situation that the bearer type is applied in the local access, if local access function of the traffic offload network element is closed or local access function does not support mobility when a user handovers between base stations, the method further comprises: the traffic offload network element releases the bearer which is applied in local access.

Preferably, the base station comprises: a Home NodeB or a macro base station.

Preferably, the mobility management unit comprises: a mobility management entity (MME) or a serving GPRS support node (SGSN).

According to another aspect of the present invention, a traffic offload network element is further provided, which comprises: a receiving module, which is configured to receive a notification from a mobility management unit of a core network, wherein the notification carries the bearer type of a bearer to be established or modified; and an implementing module, which is configured to determine whether to start data offload according to the bearer type.

Preferably, the traffic offload network element is configured to start an offload policy for a bearer which is applied in local access to perform data offload and accomplish local access; and the traffic offload network element is further configured to transmit data on a bear which is not applied in local access to the core network.

According to another aspect of the present invention, a system for indicating data offload is provided, which comprises: a mobility management unit, which is configured to notify a bearer type of the bearer when a radio bearer is established or modified; and a traffic offload network element, which is configured to receive a notification transmitted by the mobility management unit and determine whether to start data offload according to the bearer type.

Preferably, the mobility management unit determines to provide local access function to a user according to the situation of subscription of the user or the situation of network load.

Preferably, the traffic offload network element is further configured to start an offload policy for a bearer which is applied in local access to perform data offload, and transmit data on a bear which is not applied in local access to the core network.

Through at least one of the above mentioned solutions of the present invention, the problem caused by the abnormity in offload policy starting as the traffic offload network element cannot obtain the bearer type in the, which is configured to technology is solved, which simplifies the judgment operation of the core network. In addition, under the situation that the core network side determines whether to start local access function, the traffic offload network element also can correctly start an offload policy to perform data offload.

Other characteristics and advantages of the present invention will be described in the following description and partly become obvious from the description, or be understood by implementing the present invention. The objects and other advantages of the present invention can be realized and obtained through the structure indicated by the description, claims, and accompanying drawings.

BRIEF DESCRIPTION OF THE DRAWINGS

The drawings illustrated here provide a further understanding of the present invention and form a part of the description, which are used to explain the present invention with embodiments of the present invention without unduly limiting the present invention. In the accompanying drawings.

DETAILED DESCRIPTION OF THE EMBODIMENTS

The embodiments of the present invention and the features of the embodiments can be combined with each other if there is no conflict.

The preferred embodiments of the present invention are described in conjunction with the accompanying drawings hereinafter. It shall be understood that the preferred embodiments described here are only used to describe and explain the present invention, not used to limit the present invention.

Embodiment 1

A method and system for indicating data offload, and a traffic offload network element are provided in the present embodiment. Through the present solution, the traffic offload network element can effectively start an offload policy for a certain bearer to perform data offload according to the bearer type without processing the data packets of all bearers, and also can locally release radio bearers related to local access, which simplifies the judgment operation of the core network. In addition, under the situation that the core network side determines whether to start the local access function, the traffic offload network element also can correctly start an offload policy to perform data offload.

Figure 1:
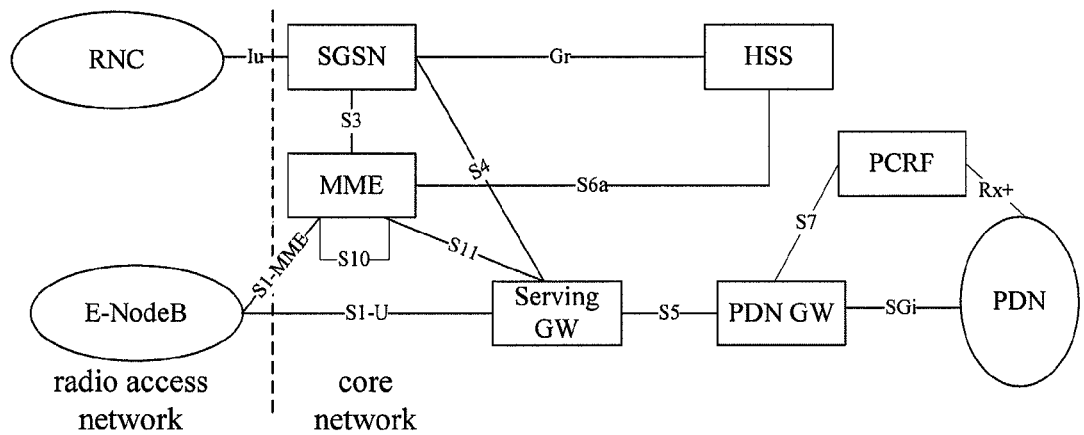
FIG. 1 is a schematic diagram of a structure of an evolved packet domain system according to the conventional art.
Figure 2:
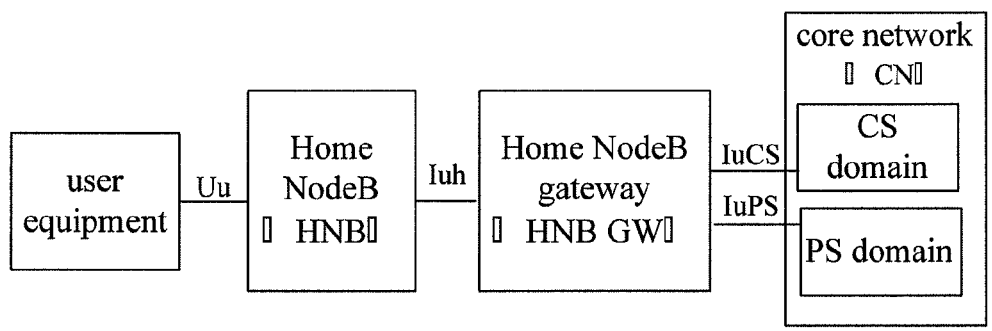
FIG. 2 is a network structure diagram of a 3G Home NodeB according to the conventional art.
Figure 3:
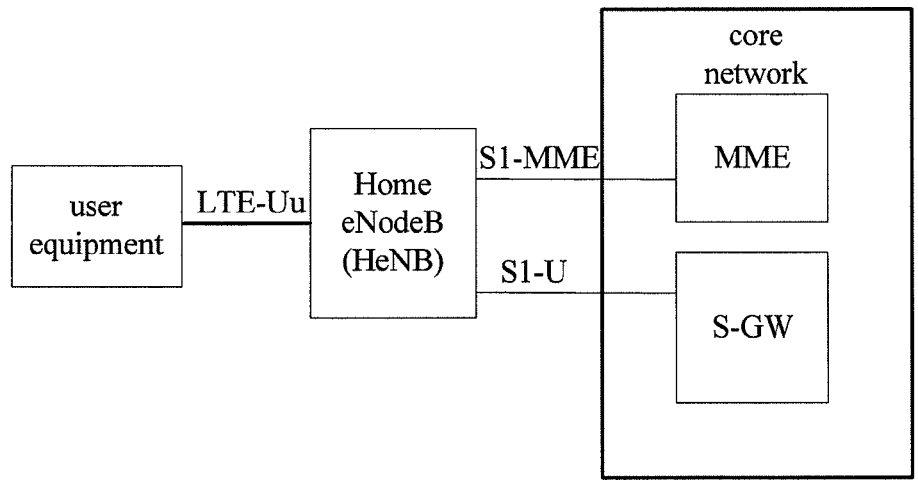
FIG. 3 is a network structure diagram in which a Home NodeB is directly connected with a network element of the core network according to the conventional art.
Figure 4:
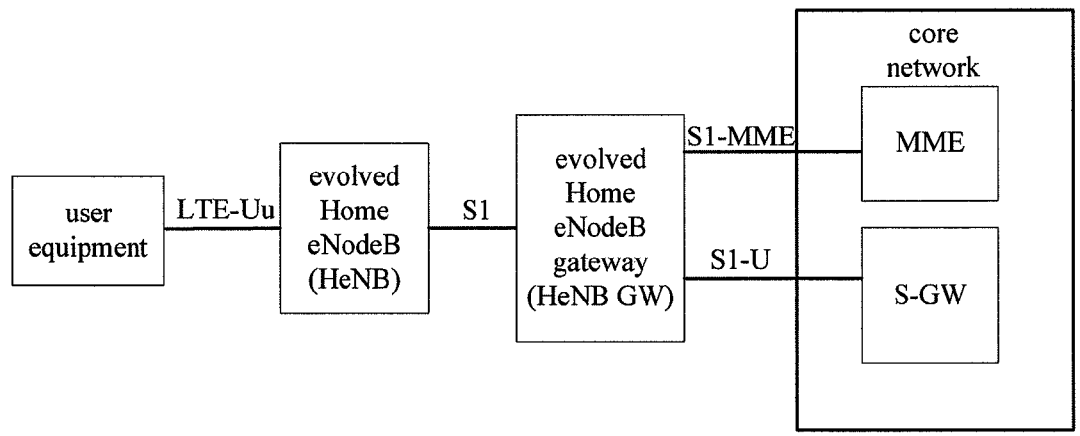
FIG. 4 is a network structure diagram in which a Home NodeB is connected with a network element of the core network through a gateway according to the conventional art.
Figure 5:
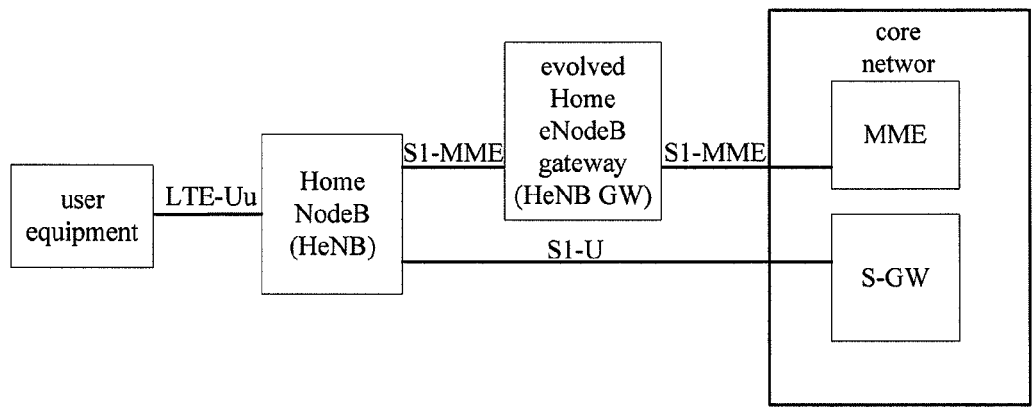
FIG. 5 is a network structure diagram in which a user plane is established directly between a Home NodeB and a user plane gateway of the core network according to the conventional art.
Figure 6:
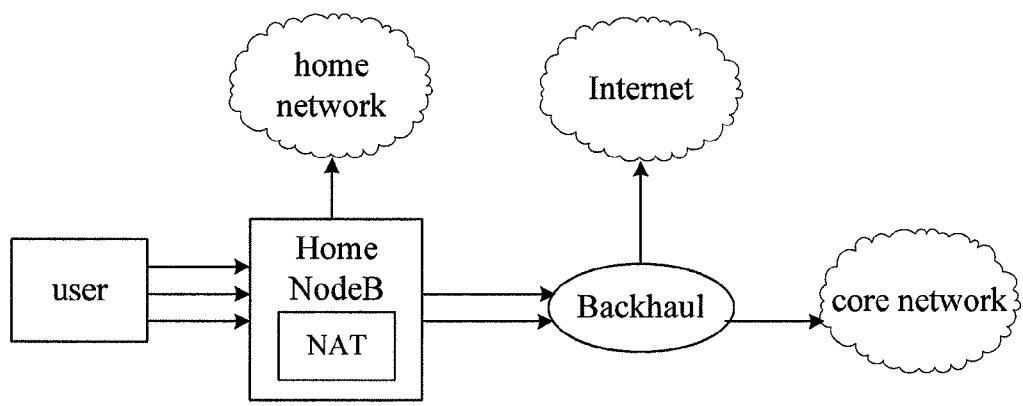
FIG. 6 is a network structure diagram of realizing a local access function according to the conventional art.
Figure 7:
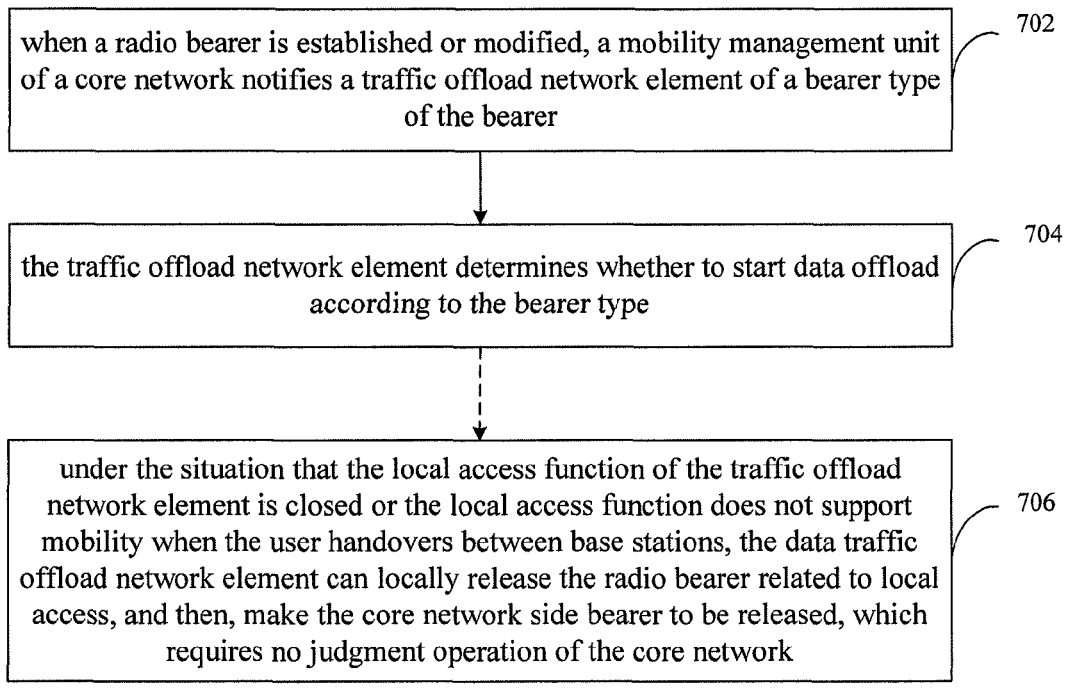
FIG. 7 is a flowchart of a method for indicating data offload according to an embodiment of the present invention.

FIG. 7 is a flowchart of a method for indicating data offload according to an embodiment of the present invention. As shown in FIG. 7, the method for indicating data offload according to an embodiment of the present invention comprises the following steps (step 702-step 706).

Step 702, when a radio bearer is established or modified, a mobility management unit of a core network notifies a traffic offload network element of a bearer type of the bearer.

Preferably, the bearer type indicates the bearer: being applied in local access, being not applied in local access. The bearer type can be represented by a newly defined parameter or by presence or absence of an existing parameter.

Preferably, the traffic offload network element can be located at a base station or at an interface (e.g. an Iu or S1 interface) between a base station and a network element of the core network.

Preferably, the base station can be a Home NodeB or a macro base station, and the mobility management unit can comprise: a MME or a SGSN. When the radio bearer is established or modified, either the MME or the SGSN can notify the traffic offload network element of the bearer type of the bearer.

Step 704, the traffic offload network element determines whether to start data offload according to the bearer type.

Preferably, if the bearer is a bearer applied in local access, the traffic offload network element starts an offload policy for the bearer to perform data offload; otherwise the traffic offload network element transmits the data on the bearer to the core network.

The offload policy comprises, but is not limited to, offload according to the bearer, offload according to target address to which data is transmitted, and offload according to service type.

Step 706, under the situation that the local access function of the traffic offload network element is closed or the local access function does not support mobility when the user handovers between base stations, the traffic offload network element can locally release the radio bearers related to the local access, and then, make the core network side bearer to be released, which requires no judgment operation of the core network.

This embodiment and the following embodiments are described taking the base station which has the traffic offload network element function as an example, as to the embodiments in which the traffic offload network element is located at an interface (a Iu or S1) between a base station and a network element of the core network, they are similar to each other, and these embodiments will not be described here redundantly, only differences between them are clarified.

Embodiment 2

Figure 8:
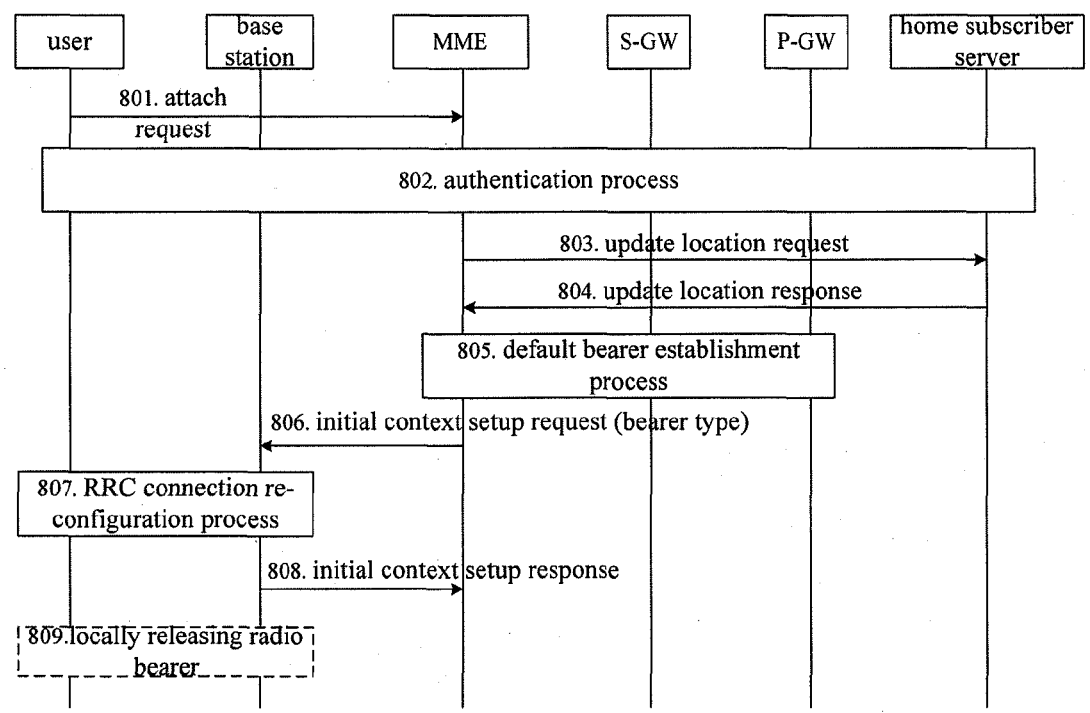
FIG. 8 is a flowchart of the implementation mode of indicating data offload when a user initiates an attach procedure according to the embodiment 2 of the present invention.

FIG. 8 is a flowchart of the implementation mode of indicating data offload when a user initiates an attach procedure according to the embodiment 2 of the present invention. As shown in FIG. 8, the flow comprises the following steps (step 801-step 809).

Step 801, the user initiate an attach procedure to register to the core network when it is powered on. This non-access layer message is encapsulated, by the base station, in an initial UE message of the S1 interface to be delivered to the MME, and the base station (the base station comprises a traffic offload network element) also notifies the core network of whether it has the capability to support local access; and if the traffic offload network element is located at an interface between the base station and a network element of the core network, the traffic offload network element notifies the core network of whether it has the capability to support local access.

Step 802, if there is no context information of the user in the network, or an attach request message has no integrity protection, or the integrity protection of the attach request message fails, the core network MME implements an authentication process to the user.

Step 803, if there is no user subscription data in the MME, an update location request message is transmitted to the home subscriber server, and the update location request message comprises information such as mobility management unit identifier, user identifier, updating type and so on.

Step 804, a user data server transmits the user subscription data to the MME in an update location response message, and the user subscription data comprises the Qos parameter of a subscription default bearer;

Step 805, in order to support the user to be permanent on-line, the MME establishes a default bearer of the core network side between the S-GW and the P-GW by using the Qos parameter of the subscription default bearer.

Step 806, after the default bearer of the core network side is established, the corresponding radio bearer needs to be activated, if the MME determines that the local access function can be provided to the user (according to the situation of user subscription or network load), the MME transmits the Qos parameter of the bearer and the type of the established bearer to the base station through an initial context setup request message, an attach accept message can also be encapsulated in this message to be transmitted to the user. The bearer type is configured to indicate whether the bearer is applied in local access. It should be noted that the bearer type can indicate whether the bearer is applied in local access through a parameter newly defined or by setting presence or absence of an existing parameter, namely the bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at a S1 interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 807, the base station establishes a corresponding air interface bearer according to the bearer information indicated by the core network.

Step 808, after the air interface bearer has been established, the base station returns an initial context setup response message to notify the core network.

Step 809, under the situation that the local access function of the base station (the base station comprises a traffic offload network element) is closed or the local access function does not support mobility when the user handovers between base stations, the base station can locally release the radio bearer related to local access, and then, make the core network side bearer to be released, which requires no judgment operation of the core network. As to the situation of deployment in which the traffic offload network element is independently deployed at a S1 interface between the base station and the network element of the core network, the traffic offload network element accomplishes the local bearer release function.

Embodiment 3

There are two implementation modes of indicating a bearer type when a user initiates a service request process. The two preferred implementation modes are described as follows in conjunction with the accompany drawings.

Figure 9:
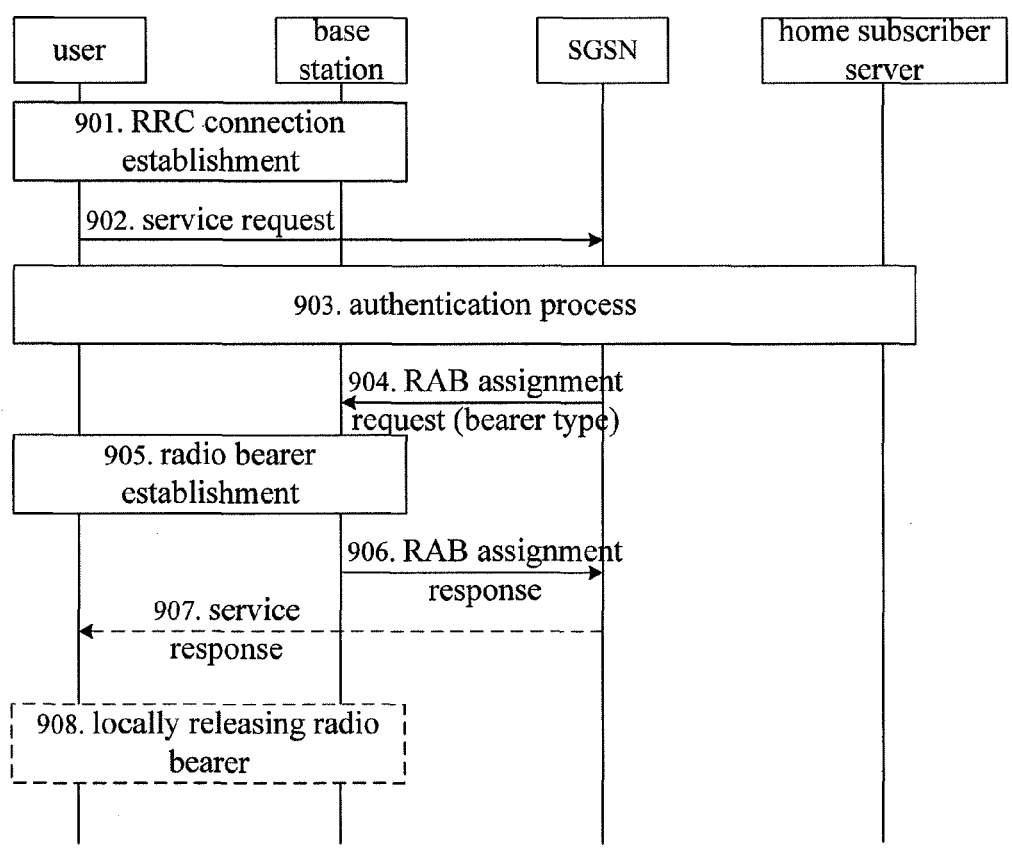
FIG. 9 is a flowchart of the implementation mode 1 of indicating data offload when a user initiates a service request procedure according to the embodiment 3 of the present invention.

FIG. 9 is a flowchart of the implementation mode 1 of indicating a bearer type when a user initiates a service request procedure according to the embodiment 3 of the present invention. As shown in FIG. 9, the flow comprises the following steps (step 901-step 908).

Step 901, before the user transmits the non-access layer message, the user needs to establish a RRC signaling connection between the user and a base station (a Home NodeB or a macro base station).

Step 902, if the user has an uplink service or there is a downlink service on the network side needs to be transmitted and paged to the user, the user will initiate a service request procedure, which carries a service type being signaling or data.

Step 903, if there is no context information of the user in the core network, the SGSN implements an authentication progress to the user.

Step 904, if the service type is data, the core network SGSN indicates, through an RAB assignment request message, the radio side to establish a bearer. If the SGSN determines that the local access function can be provided to the user (according to the situation of user subscription or network load), the Qos parameter related to the bearer and the bearer type in the message are transmitted to the base station. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at an Iu interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 905, the base station establishes a corresponding radio bearer according to the bearer Qos parameter transmitted by the SGSN.

Step 906, after the radio bearer has been established, the base station returns an RAB assignment response message to notify the core network.

Step 907, if the service request process is initiated in connection state, the core network SGSN returns a service response message to the user. If the service request process is initiated in idle state, the user can take a security mode control command message of the RRC layer as a response to the service request.

Step 908, under the situation that the local access function of the base station (the base station comprises a traffic offload network element) is closed or the local access function does not support mobility when the user handovers between base stations, the base station can locally release the radio bearer related to local access, and then, make the core network side bearer to be released, which requires no judgment operation of the core network. As to the situation of deployment in which the traffic offload network element is independently deployed at an Iu interface between the base station and the network element of the core network, the traffic offload network element accomplishes the local bearer release function.

Figure 10:
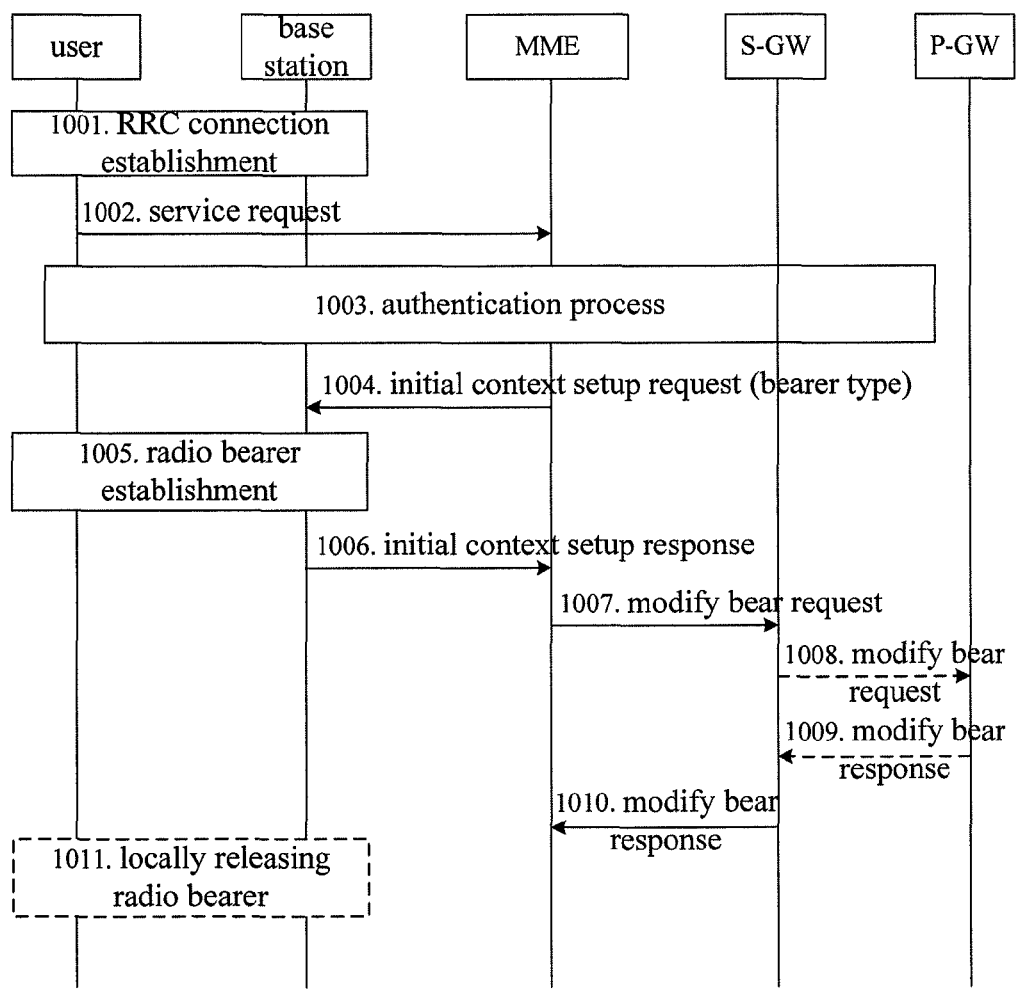
FIG. 10 is a flowchart of the implementation mode 2 of indicating data offload when a user initiates a service request procedure according to the embodiment 3 of the present invention.

FIG. 10 is a flowchart of the implementation mode 2 of indicating a bearer type when a user initiates a service request procedure according to the embodiment 3 of the present invention. As shown in FIG. 10, the flow comprises the following steps (step 1001-step 1011).

Step 1001, before the user transmits the non-access layer message, the user needs to establish a RRC signaling connection between the user and the base station (e.g. a Home NodeB or a macro base station).

Step 1002, if the user has an uplink service or there is a downlink service on the network side needs to be transmitted and paged to the user, the user will initiate a service request process.

Step 1003, if there is no context information of the user in the network, the core network MME implements an authentication process to the user.

Step 1004, the core network MME does not distinguish service type when receiving a service request message, and re-establishes all bearers which have ever been established by the core network at the radio side. If the MME determines that the local access function can be provided to the user (according to the situation of user subscription or network load), the MME transmits the Qos parameter of the radio bearer and the bearer type to the base station in the initial context setup message. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at a S1 interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload based on service type.

Step 1005, the base station establishes a corresponding radio bearer according to the bearer Qos parameter transmitted by the MME.

Step 1006, after the radio bearer has been established, the base station returns an initial context setup response message to notify the core network.

Step 1007, the core network MME transmits the base station address and a downlink tunnel identifier to the serving gateway through a modify bearer request message.

Step 1008, if the radio access technology changes or the core network requires the information of the user location to be reported for charging, the serving gateway reports the above information to the packet data gateway through a updating bearer process.

Step 1009, the packet data gateway returns a modify bearer response message.

Step 1010, the serving gateway returns a modify bearer response message.

Step 1011, under the situation that the local access function of the base station (the base station comprises a traffic offload network element) is closed or the local access function does not support mobility when the user handovers between base stations, the base station can locally release the radio bearer related to local access, and then, make the core network side bearer to be released, which requires no judgment operation of the core network. As to the situation of deployment in which the traffic offload network element is independently deployed at a S1 interface between the base station and the network element of the core network, the traffic offload network element accomplishes the local bearer release function.

Embodiment 4

Figure 11:
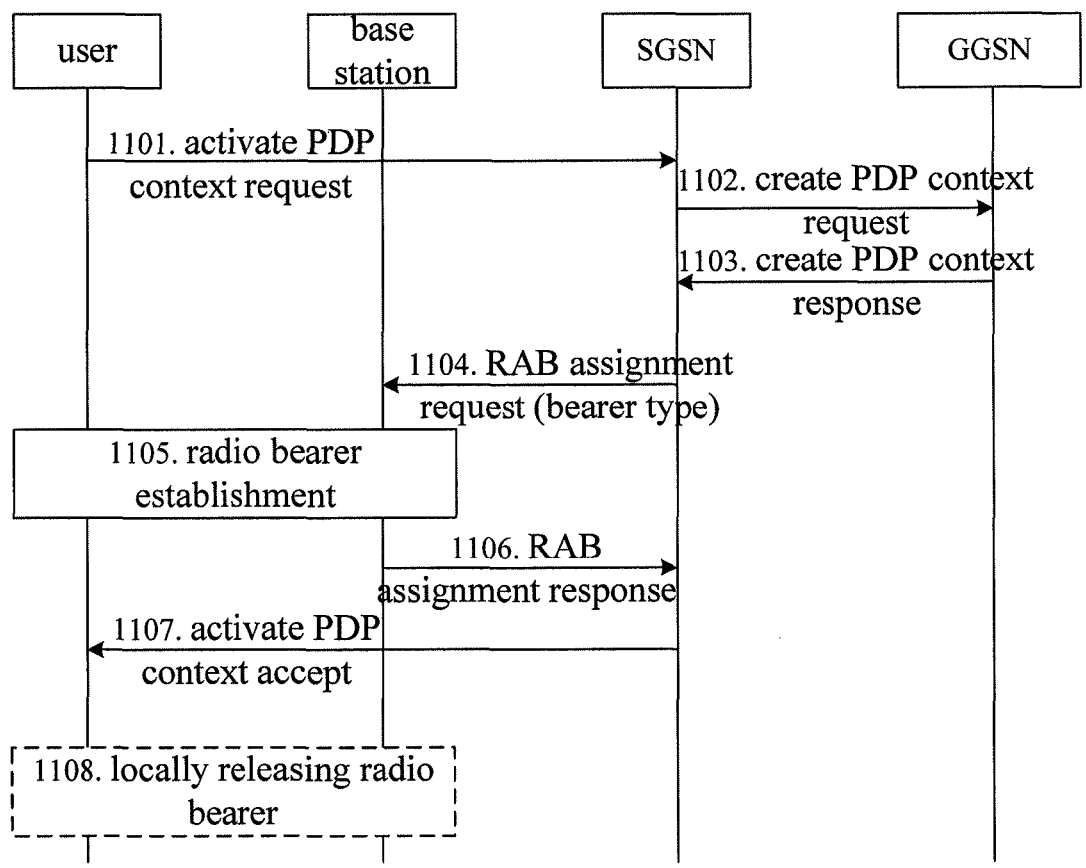
FIG. 11 is a flowchart of the implementation mode of indicating data offload when a user initiates a context activation procedure according to the embodiment 4 of the present invention.

FIG. 11 is a flowchart of the implementation mode of indicating the bearer type when a user initiates a context activation procedure according to the embodiment 4 of the present invention. As shown in FIG. 11, the flow comprises the following steps (step 1101-step 1107).

Step 1101, when the user wants to access to a certain packet data network or requests for a certain service, the user will initiate an activate PDP context request to establish a connection between the user and the packet data network through the message.

Step 1102, the SGSN uses the access point name reported by the user, through DNS inquiry, to find the GGSN which the user wants to access, and establishes a default bearer connection between the SGSN and the GGSN through a create PDP context process. In a create PDP context request message, the SGSN notifies the GGSN of the parameters such as the address of the SGSN, the bearer Qos, the identifier of the downlink tunnel connected to the bearer and so on.

Step 1103, the GGSN generates the context of the user, and returns, through a create PDP context response message, the information such as the IP address allocated for the user, the uplink tunnel identifier, the negotiated Qos parameter and so on to the SGSN.

If the SGSN is a SGSN which supports the S4 interface, the SGSN establishes, between the serving gateway S-GW and the packet data gateway P-GW, the connection between the user and the packet data network by using an create session process.

Step 1104, the SGSN needs to activate a corresponding radio bearer after establishing the default bearer of the core network side, if the SGSN determines that the local access function can be provided to the user (according to the situation of subscription or network load), the SGSN transmits the Qos parameter of the default bearer and the bearer type to the base station through a RAB assignment request message to indicate the ratio side to establish a bearer. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at an Iu interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 1105, the base station establishes a corresponding radio bearer according to the bearer Qos parameter transmitted by the SGSN.

Step 1106, after the radio bearer has been established, the base station returns an RAB assignment response message to notify the core network.

Step 1107, under the situation that the local access function of the base station (the base station comprises a traffic offload network element) is closed or the local access function does not support mobility when the user handovers between base stations, the base station can locally release the radio bearer related to local access, and then, make the core network side bearer to be released, which requires no judgment operation of the core network. As to the situation of deployment in which the traffic offload network element is independently deployed at an Iu interface between the base station and the network element of the core network, the traffic offload network element accomplishes the local bearer release function.

Embodiment 5

Figure 12:
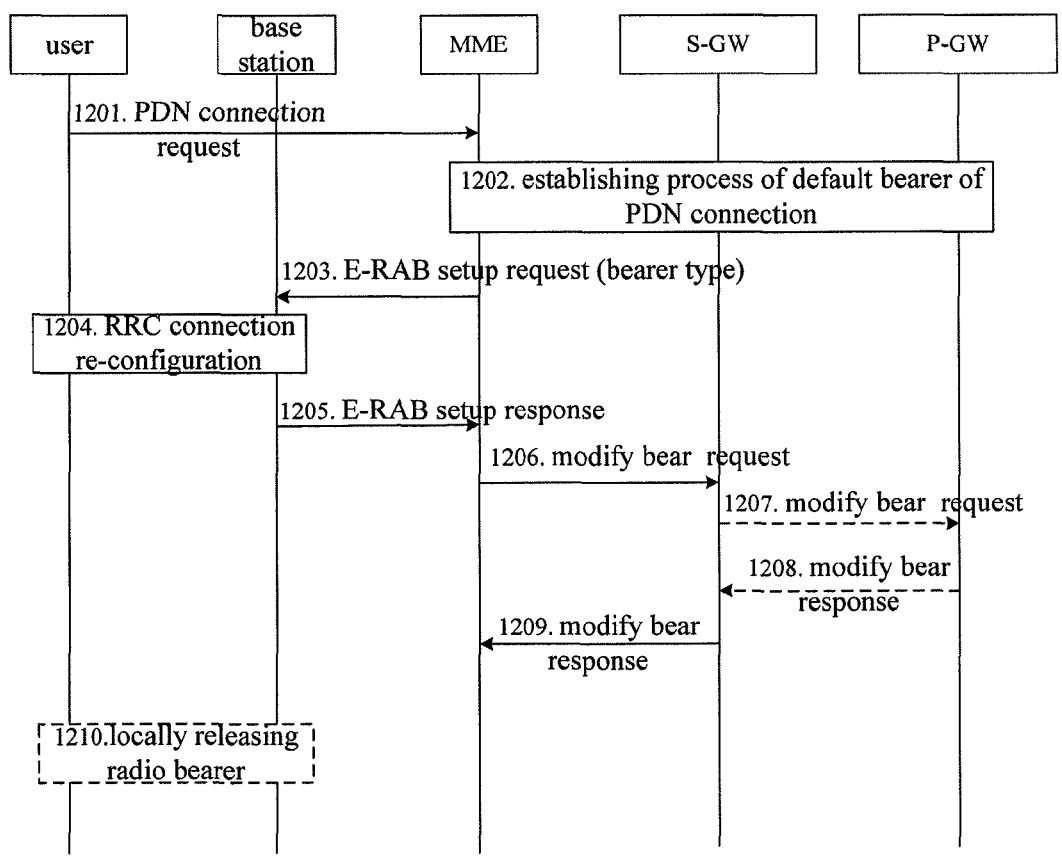
FIG. 12 is a flowchart of the implementation mode of indicating data offload when a user requests for a PDN connection establishment according to the embodiment 5 of the present invention.

FIG. 12 is a flowchart of the implementation mode of indicating the bearer type when a user requests for a PDN connection establishment according to the embodiment 5 of the present invention. As shown in FIG. 12, the flow comprises the following steps (step 1201-step 1210).

Step 1201, when the user wants to access to a certain packet data network or requests for a certain service, the user will initiate a PDN connection request to establish a connection between the user and the packet data network through the message.

Step 1202, the MME uses the access point name reported by the user, through DNS inquiry, to find the P-GW which the user wants to access, and establishes a default bearer connection between the S-GW and the P-GW through a default bearer establishing process.

Step 1203, the MME needs to activate a corresponding radio bearer after establishing the default bearer of the core network side, if the MME determines that the local access function can be provided to the user (according to the situation of subscription or network load), the MME transmits the Qos parameter of the default bearer and the bearer type to the base station through an E-RAB setup request message to indicate the ratio side to establish a bearer. The bearer type is configured to indicate whether the bearer is applied in local transmission. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at a S1 interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 1204, the base station establishes a corresponding radio bearer according to the bearer Qos parameter transmitted by the MME.

Step 1205, after the radio bearer has been established, the base station returns an E-RAB setup response message to notify the core network.

Step 1206, the core network MME transmits the base station address and a downlink tunnel identifier to a serving gateway through a modify bearer request message.

Step 1207, if the radio access technology changes or the core network requires the information of the user location to be reported for charging, the serving gateway reports the above information to the packet data gateway through an updating bearer process.

Step 1208, the packet data gateway returns a modify bearer response message.

Step 1209, the serving gateway returns a modify bearer response message.

Step 1210, under the situation that the local access function of the base station (the base station comprises a the traffic offload network element) is closed or the local access function does not support mobility when the user handovers between base stations, the base station (comprising traffic offload network element) can locally release the radio bearer related to local access, and then, make the core network side bearer to be released, which requires no judgment operation of the core network. As to the situation of deployment in which the traffic offload network element is independently deployed at a S1 interface between the base station and the network element of the core network, the traffic offload network element accomplishes the local bearer release function.

Embodiment 6

Figure 13:
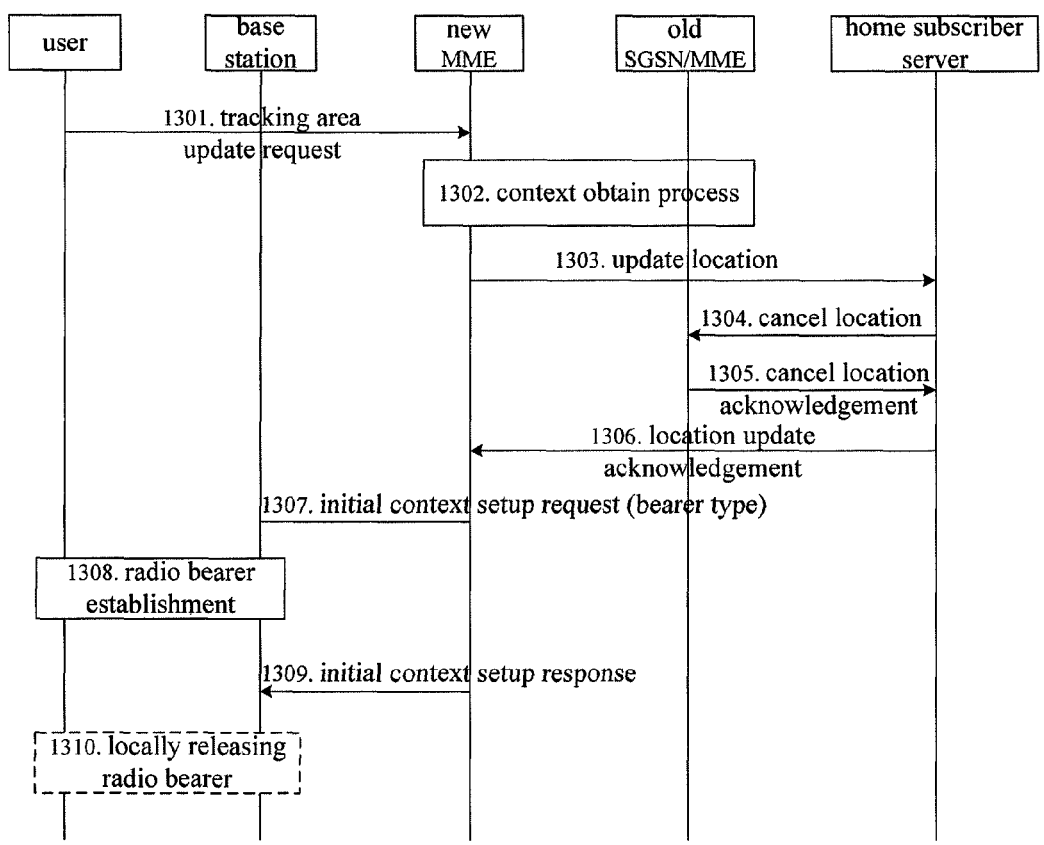
FIG. 13 is a flowchart of the implementation mode of indicating data offload when a user initiates a tracking area update procedure according to the embodiment 6 of the present invention.

FIG. 13 is a flowchart of the implementation mode of indicating the bearer type when a user initiates a tracking area update procedure according to the embodiment 6 of the present invention. As shown in FIG. 13, the flow comprises the following steps (step 1301-step 1310).

Step 1301, if the user moves to a new tracking area which is not in a tracking area list, the user initiates a tracking area update request message, which carries information such as a temporary identifier of the user, the old tracking area identifier, the user capability and so on. If the user has uplink data to be transmitted at the same time, an activation mark bit is set in the request message to request the core network to establish an air interface bearer during the process of updating the tracking area.

Step 1302, a new MME finds the old SGSN or MME according to the temporary user identifier to obtain the context information of the user.

Step 1303, if there is no user subscription data in the MME, an update location request message is transmitted to a user data server, and the update location request message comprises information such as mobility management unit identifier, user identifier, and updating type.

Step 1304, when ISR (idle mode signaling reducing) function is not activated, if the home subscriber server knows that the user registers from a new mobility management unit, the home subscriber server transmits a cancel location message to the old mobility management unit to delete the context information of the user in the old mobility management unit, and release the signaling connection under the old base station.

Step 1305, the old mobility management unit returns a cancel location acknowledgement message.

Step 1306, the home subscriber server transmits the user subscription data downwards to the MME through an update location acknowledgement message. The update location acknowledgement message indicates that the user location updating has been finished and a new mobility management unit has already registered in the user data server.

Step 1307, if the user carries an active flag in the tracking area update request, the core network MME indicate the base station to establish a radio bearer through an initial context setup request message. If the MME determines that the local access function can be provided to the user (according to the situation of user subscription or network load), the MME transmits the Qos information of the radio bearer and the bearer type to the base station through the message. A tracking area update accept message can also be encapsulated in the message and transmitted to the user through the base station. If the user does not carry an active flag, the core network will not establish a radio bearer, but transmit the tracking area update accept message to the user through a downlink non-access layer transmission message. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at a S1 interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 1308, the base station establishes a corresponding radio bearer according to the bearer Qos parameter transmitted by the MME.

Step 1309, after the air interface bearer has been established, the base station returns an initial context setup response message to notify the core network.

Step 1310, under the situation that the local access function of the base station (the base station comprises a traffic offload network element) is closed or the local access function does not support mobility when the user handovers between base stations, the base station can locally release the radio bearer related to local access, and then, make the core network side bearer to be released, which requires no judgment operation of the core network. As to the situation of deployment in which the traffic offload network element is independently deployed at a S1 interface between the base station and the network element of the core network, the traffic offload network element accomplishes the local bearer release function.

Embodiment 7

In this embodiment, two preferred implementation modes of indicating the bearer type in handover procedure are provided. The two implementation modes are described as follows in conjunction with the accompany drawings.

Figure 14:
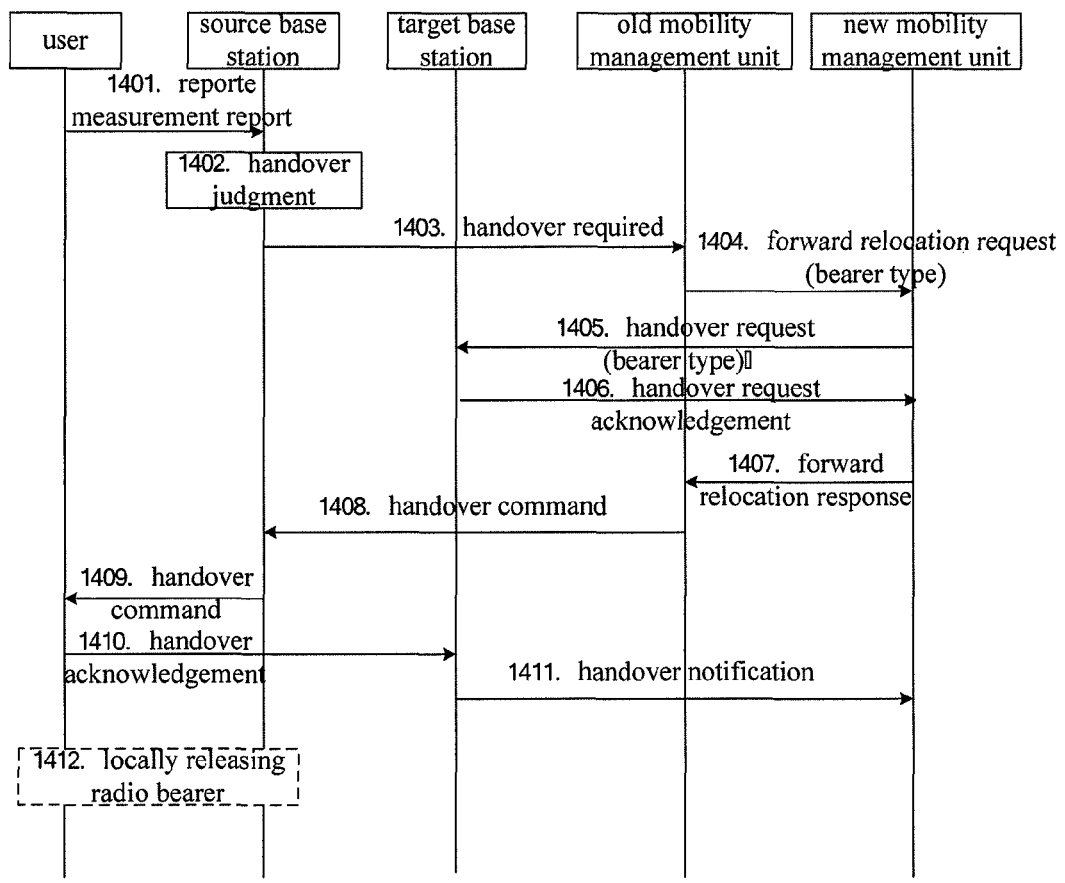
FIG. 14 is a flowchart of the implementation mode 1 of indicating data offload in a handover procedure according to the embodiment 7 of the present invention.

FIG. 14 is a flowchart of the implementation mode 1 of indicating the bearer type in a handover procedure according to the embodiment 7 of the present invention. As shown in FIG. 14, the flow comprises the following steps (step 1401-step 1412).

Step 1401, the user measures the situation of a radio signal of an adjacent cell, and reports it, in the form of a measurement report, to the base station which is currently serving the user.

Step 1402, the source base station finds the signal of the cell which the user is currently located becomes weak according to the measurement report reported by the user and the user needs to be handovered to another base station, then the source base station selects a target base station to initiate the handover.

Step 1403, if the source base station judges, according to the interface situation between base stations or the location information of the target base station, that it is necessary to initiate the handover performed by the core network, the source base station transmits a handover required message to the old mobility management unit, the message carries information such as an indication indicating whether a direct forwarding tunnel is supported, a target base station identifier and so on.

Step 1404, the old mobility management unit determines, according to the information of the target base station, whether to re-select the mobility management unit. If the mobility management unit has been re-selected, the messages such as the user context, the target base station identifier, the direct forwarding indication and so on are transmitted to the new mobility management unit by forwarding the handover required message. The user context comprises the established bearer information and bearer type. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at an Iu interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 1405, the new mobility management unit transmits a handover request message to the target base station to indicate the target base station to reserve handover resources, and the message comprises parameters such as a bearer establishing list, a handover restriction list, a source-target transmission container, a bearer type and so on.

Step 1406, after the radio bearer of the target base station has been established, a handover request acknowledgement message is returned.

Step 1407, the new mobility management unit notifies the old mobility management unit that the target side is ready for handover through a forward relocation response message.

Step 1408, the old mobility management unit transmits a handover command to the source base station.

Step 1409, the old source base station transmits the handover command to the user to indicate the user to handover to the target base station.

Step 1410, the user transmits a handover acknowledgement message after the user synchronizes to the target base station.

Step 1411, the target base station notifies, through a handover notification message, the new mobility management unit that the handover has been completed, and the message carries the address of the target base station and the downlink tunnel identifier.

Step 1412, under the situation that the local access function of the base station (the base station comprises a traffic offload network element) is closed or the local access function does not support mobility when the user handovers between base stations, the base station (comprising a the traffic offload network element) can locally release the radio bearer related to local access, and then, make the core network side bearer to be released, which requires no judgment operation of the core network. As to the situation of deployment in which the traffic offload network element is independently deployed at an Iu interface between the base station and the network element of the core network, the traffic offload network element accomplishes the local bearer release function.

Figure 15:
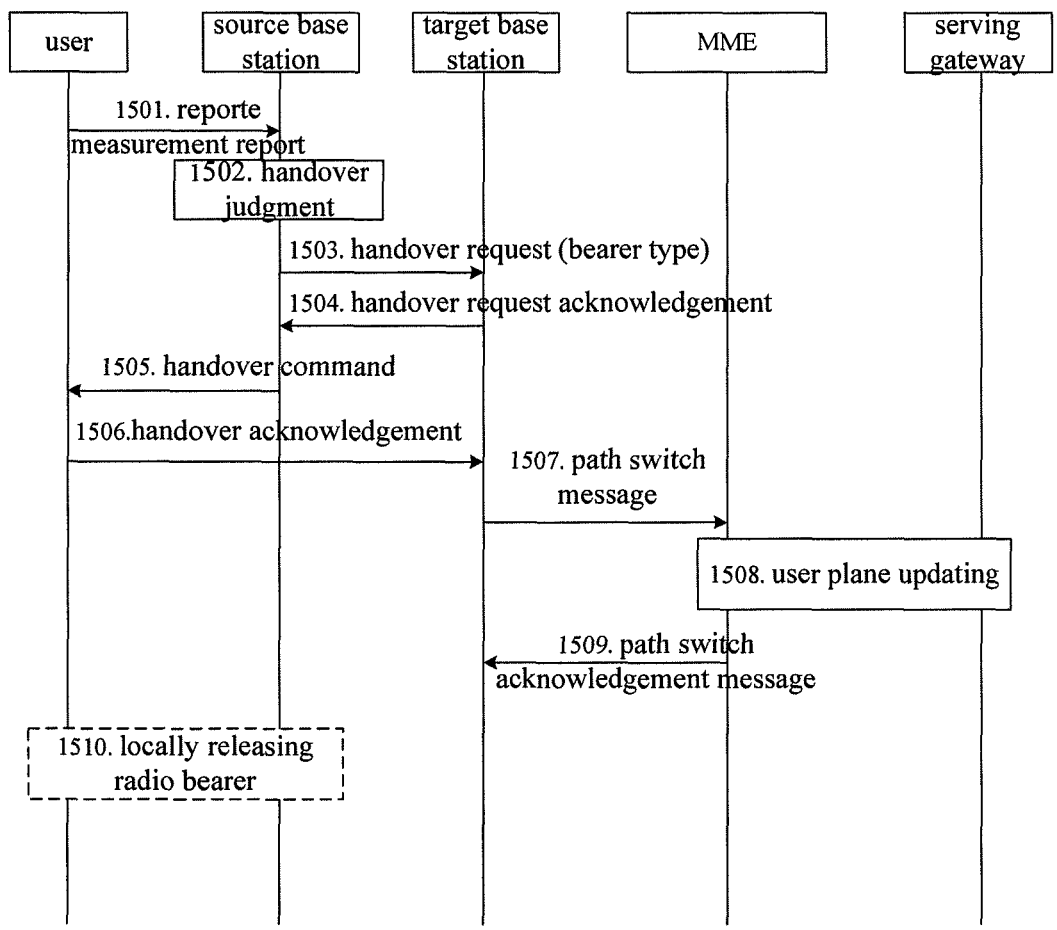
FIG. 15 is a flowchart of the implementation mode 2 of indicating data offload in a handover procedure according to the embodiment 7 of the present invention.

FIG. 15 is a flowchart of the implementation mode 2 of indicating the bearer type in a handover procedure according to the embodiment 7 of the present invention. As shown in FIG. 15, the flow comprises the following steps (step 1501-step 1510).

Step 1501, the user measures the situation of a radio signal of an adjacent cell, and reports it, in the form of a measurement report, to the base station which is currently servicing the user.

Step 1502, the source base station finds the signal of the cell which the user is currently located becomes weak according to the measurement report reported by the user and the user needs to be handover to another base station, then the source base station selects a target base station to initiate the handover.

Step 1503, if the source base station judges, according to the interface situation between base stations or the location information of the target base station, that it is necessary to initiate the handover between base stations, the source base station transmits a handover request message to the target base station, and the message carries information such as RRC context, target base station identifier, AS layer configuration, radio bearer parameter, bearer type and so on. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at a S1 interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 1504, the target base station allocates radio resources according to the parameters carried in the handover request message, and after the handover preparation has been done, triggers the handover to the target base station initiated by the user.

Step 1505, the source base station indicates the user to handover to the target base station through a handover command.

Step 1506, after the user successfully synchronizes to the cell of the target base station, the user transmits a handover acknowledgement message to the target base station to indicate that the handover process has been completed, and then the target Home NodeB can start to transmit the buffered downlink data to the user.

Step 1507, the target base station notifies, through a path switch request message, the MME that the servicing cell of the user has been changed.

Step 1508, a user plane updating process is implemented between the MME and the serving gateway, the serving gateway is notified of the address of the base station and the downlink tunnel identifier, and the downlink data of the core network can be transmitted now.

Step 1509, the MME returns a path switch acknowledgement message to the target base station to provide the updated UE-AMBR or indicate the establishments of which bearers are failed in order to indicate the radio side to delete the corresponding bearers.

Step 1510, under the situation that the local access function of the base station (the base station comprises a the traffic offload network element) is closed or the local access function does not support mobility when the user handovers between base stations, the base station (comprising a traffic offload network element) can locally release the radio bearer related to local access, and then, make the core network side bearer to be released, which requires no judgment operation of the core network. As to the situation of deployment in which the traffic offload network element is independently deployed at a S1 interface between the base station and the network element of the core network, the traffic offload network element accomplishes the local bearer release function.

If the source base station and the target base station are served by a same mobility management unit, the handover process is finished by a single mobility management unit. Step 1504 and step 1507 do not need to be transmitted. The mobility management unit directly transmits a handover request message to the target base station to indicate the bearer type.

Embodiment 8

In this embodiment, two preferred implementation modes of the mobility management unit updating the bearer indication are provided. The specific two implementation modes are described as follows in conjunction with the accompany drawings.

Figure 16:
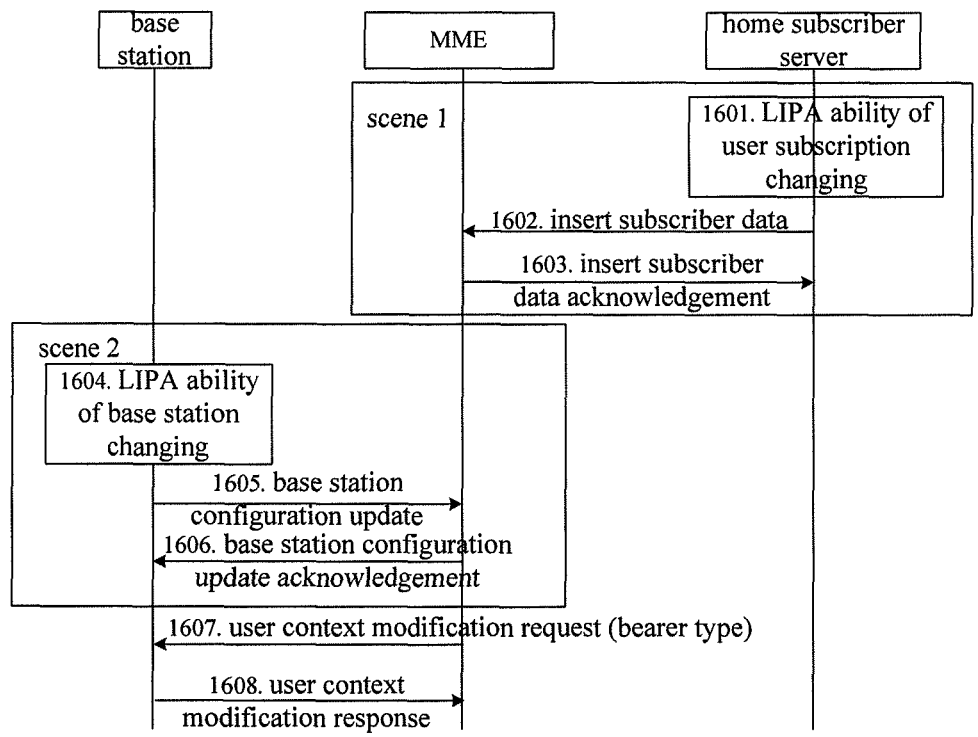
FIG. 16 is a flowchart of the implementation mode 1 of the mobility management unit updates data offload capability according to the embodiment 8 of the present invention.

FIG. 16 is a flowchart of the implementation mode 1 of the mobility management unit updates the bearer indication according to the embodiment 8 of the present invention. As shown in FIG. 16, the flow comprises the following steps (step 1601-step 1608).

Step 1601, in the first application scene, the user negotiates with the operator to modify the subscription of local IP accessibility.

Step 1602, the home subscriber server notifies the core network MME of the modified subscription data through an insert subscriber data process.

Step 1603, the MME returns an insert subscriber data acknowledgement message after receiving the user subscription data; the MME finds a bearer related to the user local accessibility to modify the bearer type.

Step 1604, in the second application scene, the local accessibility of the base station (the base station comprises a traffic offload network element) is modified under the control of the operator or the owner of the base station, that is to say, the base station no longer implements the local access function, and all the user data are transmitted through the core network.

Step 1605, the base station reports the modification of the local accessibility to the MME through a base station configuration update message.

Step 1606, the MME returns an acknowledgement message to the base station after receiving the updated local accessibility of the base station, and finds the corresponding local access bearer to modify the type.

Step 1607, if the user is in connection state, the MME delivers the bearer type to the base station through a user context modification request message.

Step 1608, the base station performs update after receiving the new bearer type, and returns a user context modification response message.

As to the deployment scene in which the traffic offload network element is located at a S1 interface between the base station and the network element of the core network, the same base station update notifying mechanism is used for the change in the local access function of the traffic offload network element, and the core network MME notifies the traffic offload network element of the updated bearer type.

The bearer type can be represented through a newly defined parameter or presence or absence of an existing parameter (e.g. APN, MSISDN, Charging characteristics and so on).

Figure 17:
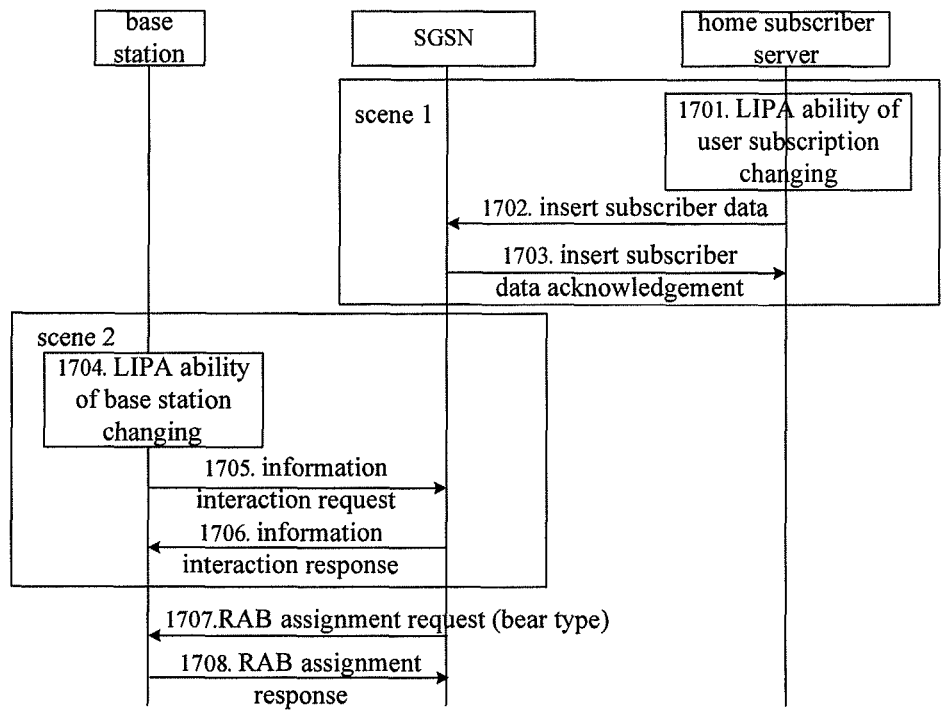
FIG. 17 is a flowchart of the implementation mode 2 of the mobility management unit updates data offload capability according to the embodiment 8 of the present invention.

FIG. 17 is a flowchart of the implementation mode 2 of the mobility management unit updates the bearer indication according to the embodiment 8 of the present invention. As shown in FIG. 17, the flow comprises the following steps (step 1701-step 1708).

Step 1701, in the first application scene, the user negotiates with the operator to modify the subscription of local IP accessibility.

Step 1702, the home subscriber server notifies the core network SGSN of the modified subscription data through an insert subscriber data process.

Step 1703, the SGSN returns an insert subscriber data acknowledgement message after receiving the user subscription data; the SGSN finds a bearer related to the user local accessibility to modify the bearer type.

Step 1704, in the second application scene, the local accessibility of the base station (the base station comprises a traffic offload network element) is modified under the control of the operator or the owner of the base station, that is to say, the base station no longer implements the local access function, and all the user data are transmitted through the core network.

Step 1705, the base station reports the modification of the local accessibility to the SGSN through an information interaction request.

Step 1706, the SGSN returns an information interaction response message to the base station after receiving the new configuration message of the base station, and finds the corresponding local access bearer to modify the type.

Step 1707, the SGSN delivers the bearer type to the base station through an RAB assignment request message.

Step 1708, the base station performs update after receiving the new bearer type, and returns an RAB assignment response message.

As to the deployment scene in which the traffic offload network element is located at an Iu interface between the base station and the network element of the core network, the same information interaction notifying mechanism is used for the change in the local access function of the traffic offload network element, and the core network SGSN notifies the traffic offload network element of the updated bearer type.

The bearer type can be represented through a newly defined parameter or presence or absence of an existing parameter (e.g. APN, MSISDN, Charging characteristics and so on).

Example 9

Figure 18:
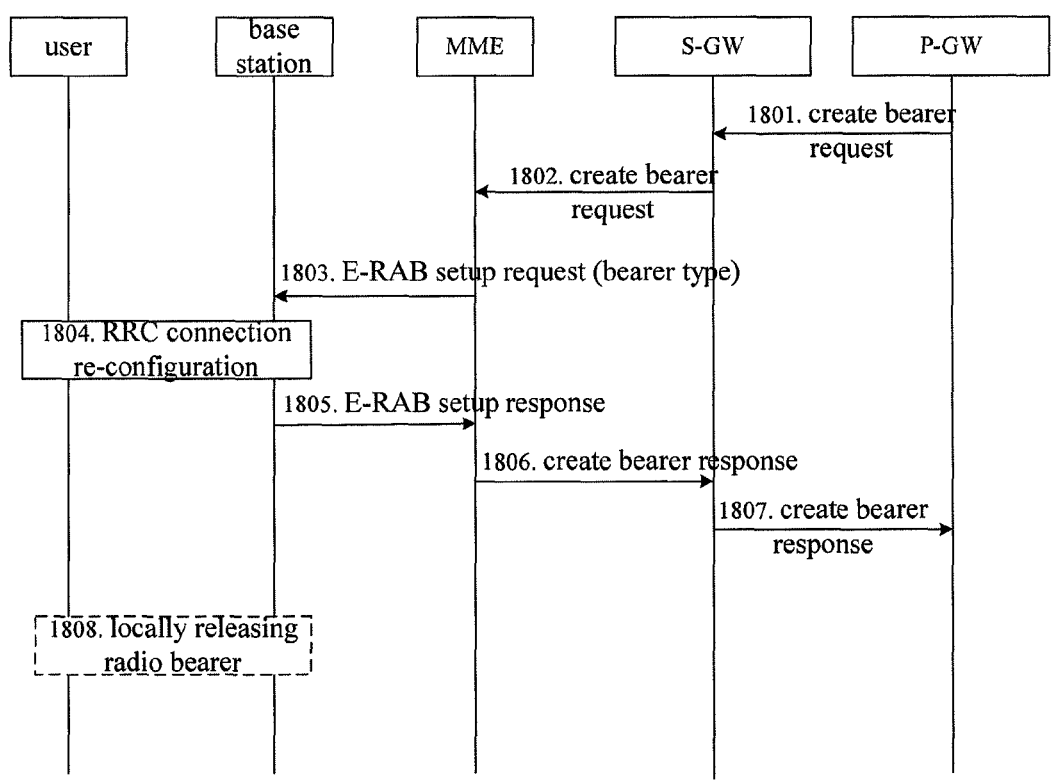
FIG. 18 is a flowchart of the implementation mode of indicating data offload when the network activates a dedicate bearer according to the embodiment 9 of the present invention.

FIG. 18 is a flowchart of the implementation mode of indicating the bearer type when the network activates a dedicate bearer according to the embodiment 9 of the present invention. As shown in FIG. 18, the flow comprises the following steps (step 1801-step 1808).

Step 1801, if the P-GW finds that the bearer resources supporting the user service are not sufficient according to a Qos policy locally configured or downloaded by a policy server, the P-GW establishes a dedicate bearer for the user through a bearer establishment process. The P-GW transmits, through a create bearer request message, the information such as the Qos parameter of the new bearer, TFT, the tunnel identifier of S5/S8 interface and so on to the S-GW.

Step 1802, the S-GW transmits a create bearer request message to the MME, and the message comprises information such as the Qos parameter of the bearer, TFT, and an S1 interface user plane tunnel identifier.

Step 1803, the MME knows, according to the received create bearer request message, that a corresponding air interface bearer needs to be established, and then, the MME delivers the Qos parameter of the bearer to the base station through an E-RAB setup request message, if this bearer is non-GBR and can be used by the local access service, the bearer type is transmitted together with the Qos parameter. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at an Iu interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 1804, the base station establishes a corresponding air interface bearer according to the Qos parameter.

Step 1805, the air interface bearer has been established, and the base station returns an E-RAB setup response message.

Step 1806, the MME notifies the S-GW of the base station address and the downlink tunnel identifier information through a create bearer response.

Step 1807, the S-GW returns a create bearer response message to the P-GW to notify that the dedicate bearer has been established.

Step 1808, under the situation that the local access function of the base station (the base station comprises a traffic offload network element) is closed or the local access function does not support mobility when the user handovers between base stations, the base station (comprising a traffic offload network element) can locally release the radio bearer related to local access, and then, make the core network side bearer to be released, which requires no judgment operation of the core network. As to the situation of deployment in which the traffic offload network element is independently deployed at a S1 interface between the base station and the network element of the core network, the traffic offload network element accomplishes the local bearer release function.

For the 3G system, the GGSN also can establish a dedicate bearer, which is referred to as secondary PDP context activation procedure initiated by the GGSN. Similar to this embodiment, the type of the newly established bearer can be transmitted to the base station in the RAB assignment message, and it will not be described redundantly here.

Embodiment 10

Figure 19:
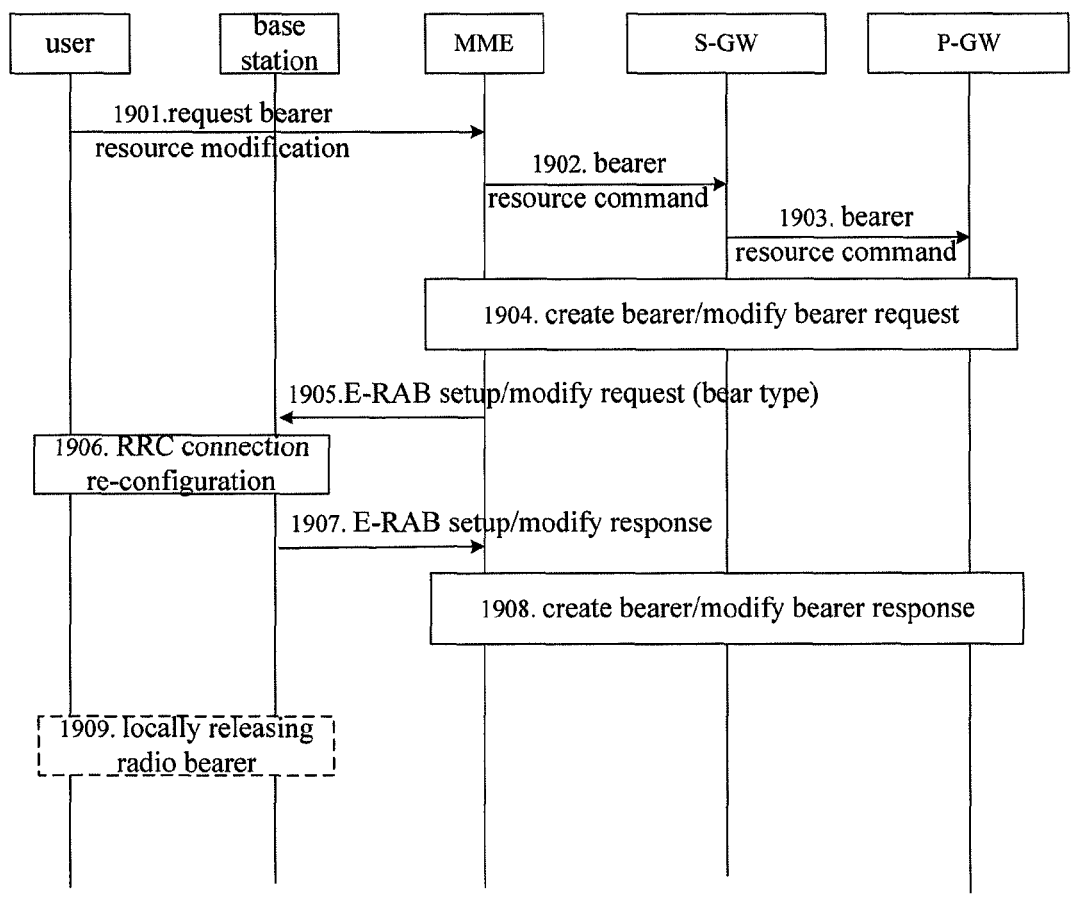
FIG. 19 is a flowchart of the implementation mode of indicating data offload when a user requests for resource allocation according to the embodiment 10 of the present invention.

FIG. 19 is a flowchart of the implementation mode of indicating the bearer type when a user requests for resource allocation according to the embodiment 10 of the present invention. As shown in FIG. 19, the flow comprises the following steps (step 1901-step 1909).

Step 1901, when the UE finds that the bearer resources of a certain service are not sufficient, the UE initiates a request bearer resource modification message, to transmit parameters such as Qos parameter of the requested bearer, identifier information, and protocol configuration option and so on to the MME.

Step 1902, the MME transmits the above parameters to the S-GW through a bearer resource command message.

Step 1903, the S-GW transmits the above parameters to the P-GW through the bearer resource command message, and the S-GW only implements the function of forwarding.

Step 1904, if the P-GW finds that the bearer resources supporting the user service are not sufficient according to a Qos policy locally configured or downloaded by a policy server, the P-GW initiates a bearer establishment or modification process.

Step 1905, the MME knows, according to the received create bearer or modify bearer request message, that a corresponding air interface bearer needs to be established or updated, and then, the MME delivers the Qos parameter of the bearer to the base station through an E-RAB setup or modify request message, if the bearer is non-GBR and can be used by the local access service, the bearer type is transmitted together with the Qos parameter. The bearer type is configured to indicate whether the bearer is applied in local access. The bearer type can be represented through a newly defined parameter or presence or absence of an existing parameter (e.g. APN, MSISDN, Charging characteristics and so on). The base station (the base station comprises a traffic offload network element) only can start an offload policy for the bearer which can be applied in local access to perform data offload, and the data on the bearer which can not be applied in local access is transmitted to the core network. As to the situation of deployment in which the traffic offload network element is independently deployed at an Iu interface between the base station and the network element of the core network, the traffic offload network element only can start an offload policy for the bearer which can be applied in local access to perform data offload, and the data on the bearer which can not be applied in local access is transmitted to the core network. The offload policy comprises, but is not limited to, offload according to the bearer, offload according to target address to which data is transmitted, and offload according to service type.

Step 1906, the base station establishes or updates a corresponding air interface bearer according to the Qos parameter.

Step 1907, the air interface bearer has been established or updated, and the base station returns an E-RAB setup or modify response message.

Step 1908, the MME gets the downlink tunnel through, through the create bearer or modify bearer response process, and notifies the P-GW that the flow is completed.

Step 1909, under the situation that the local access function of the base station (the base station comprises a traffic offload network element) is closed or the local access function does not support mobility when the user handovers between base stations, the base station (comprising a traffic offload network element) can locally release the radio bearer related to local access, and then, make the core network side bearer to be released, which requires no judgment operation of the core network. As to the situation of deployment in which the traffic offload network element is independently deployed at a S1 interface between the base station and the network element of the core network, the traffic offload network element accomplishes the local bearer release function.

For the 3G system, the UE can also request for bearer resource establishment or modification according to the situation of the resource of the UE itself, which is referred to as secondary PDP context activate procedure or PDP context modification process initiated by the UE. Similar to this embodiment, the type of the bearer can be transmitted to the base station in the RAB assignment or RAB modify message, and it will not be described redundantly here.

Embodiment 11

In this embodiment, a traffic offload network element is provided. The traffic offload network element is used to implement the method of each example.

Figure 20:
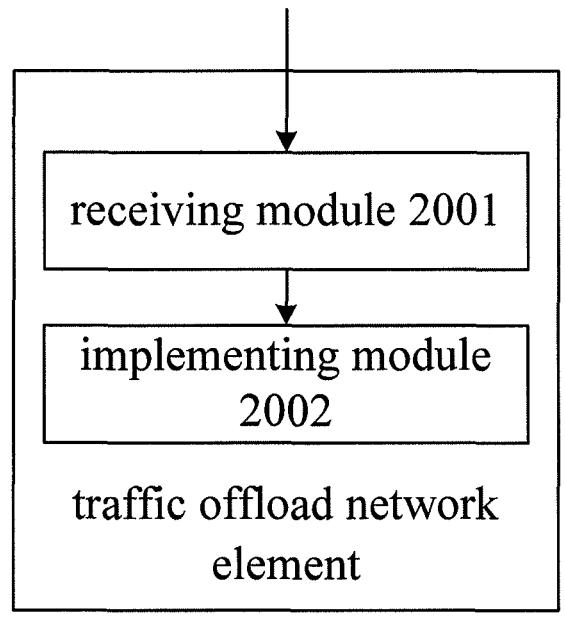
FIG. 20 is a schematic diagram of a structure of a traffic offload network element according to an embodiment of the present invention.

FIG. 20 is a schematic diagram of a structural of a traffic offload network element according to an embodiment of the present invention. As shown in FIG. 20, the traffic offload network element according to the embodiment of the present invention comprises: a receiving module 2001 and an implementing module 2002, wherein the receiving module 2001 is configured to receive a notification from a mobility management unit of a core network, wherein the notification carries the bearer type of a bearer to be established or modified; and the implementing module 2002 is configured to determini3 whether to start data offload according to the bearer type.

The traffic offload network element starts an offload policy for a bearer which is applied in local access to perform data offload, wherein the offload policy comprises, but is not limited to, offload according to the bearer, offload according to target address to which data is transmitted, and offload according to service type.

The traffic offload network element transmits the data on a bear which is not applied in local access to the core network.

The traffic offload network element can be located at a base station or at an interface (an Iu or S1) between a base station and a network element of the core network.

According to an example of the present invention, a system for indicating the bearer type is provided.

Figure 21:
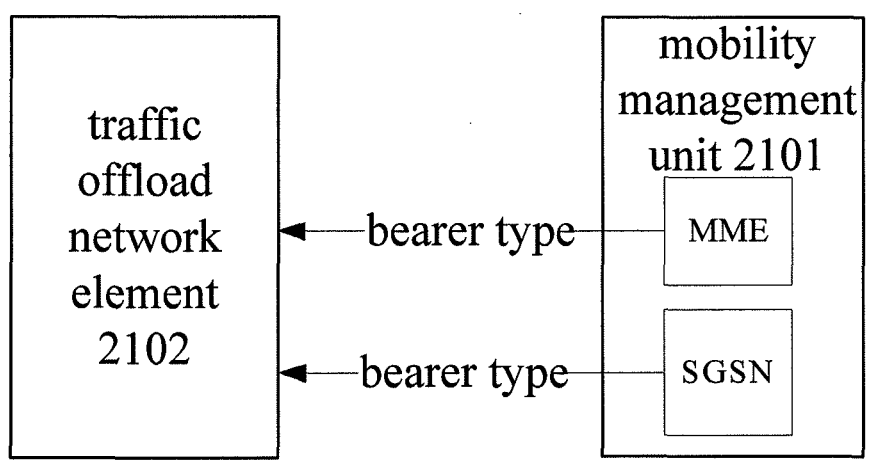
FIG. 21 is a system structure diagram of a system indicating data offload according to an embodiment of the present invention.

FIG. 21 is a system structure diagram of a system indicating the bearer type according to an embodiment of the present invention. As shown in FIG. 21, the system for indicating the bearer type according to the example of the present invention includes: a mobility management unit 2101 and a traffic offload network element 2102, wherein the mobility management unit 2101 is configured to notify a bearer type of a bearer when radio side is indicated to establish or modify the bearer; and the traffic offload network element 2102 is configured to receive a notification transmitted by the mobility management unit and determine whether to start data offload according to the bearer type.

The mobility management unit 2101 comprises: a MME or a SGSN. When the radio side is indicated to establish or modify a bearer, either the MME or SGSN can notify the traffic offload network element of the bearer type of the bearer.

Preferably, the mobility management unit 2101 determines to provide local access function to a user according to the situation of subscription of the user or the situation of network load.

Preferably, the traffic offload network element 2102 is further configured to start an offload policy for a bearer which is applied in local access to perform data offload, and transmit data on a bear which is not applied in local access to the core network.

As mentioned above, by the virtue of the technical solutions provided by the embodiments of the preset invention, not only the traffic offload network element is enabled to only use an offload policy for a certain bearer, without processing data packets of all bearers, when the local access function is started, but also, under the situation that the local access function of the traffic offload network element is closed or the local access function does not support mobility when the user handovers between base stations, the traffic offload network element locally releases the radio bearer related to local access, and then, makes the core network side bearer to be released, thus the judgment operation of the core network is simplified. In addition, under the situation that the core network side determines whether to start local access function, the traffic offload network element also can correctly start the offload policy.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for indicating data offload, comprising:
when a radio bearer is established or modified, a mobility management unit of a core network notifies a traffic offload network element of the bearer type of the bearer to determine whether to start the data offload; wherein the bearer type is configured to indicate whether the bearer is applied in local access.

2. The method according to claim 1, wherein the bearer type indicates whether the bearer is applied in local access through a parameter newly defined or by setting presence or absence of an existing parameter.

3. The method according to claim 1, wherein, before the mobility management unit notifies the traffic offload network element of the bearer type of the bearer, the method further comprises:
the mobility management unit determines to provide local access function to a user according to the situation of subscription of the user or the situation of network load.

4. The method according to claim 1, wherein, after the mobility management unit notifies the traffic offload network element of the bearer type, the method further comprises:
the traffic offload network element starts an offload policy for a bearer applied in local access to perform data offload; and
the traffic offload network element transmits data on a bear which is not applied in local access to the core network.

5. The method according to claim 4, wherein the traffic offload network element is located at a base station or at an interface between a base station and a network element of the core network.

6. The method according to claim 4, wherein the offload policy comprises at least one of the following: offload according to the present bearer, offload according to target address to which data is transmitted, and offload according to service type.

7. The method according to claim 1, wherein the local access comprises: local access of a user to other network protocol IP devices of home and enterprise networks, the Internet network, or other particular networks.

8. The method according to claim 1, wherein, under the situation that the bearer type is applied in the local access, if local access function of the traffic offload network element is closed or local access function does not support mobility when a user handovers between base stations, the method further comprises: the traffic offload network element releases the bearer which is applied in local access.

9. The method according to claim 5, wherein the base station comprises: a Home NodeB or a macro base station.

10. The method according to claim 1, wherein the mobility management unit includes: a mobility management entity (MME) or a serving GPRS support node (SGSN).

11. A traffic offload network element, comprising:
a hardware processor, configured to execute modules on a memory, the modules comprising:
a receiving module, configured to receive a notification from a mobility management unit of a core network, wherein the notification carries the bearer type of a bearer to be established or modified; and an implementing module, configured to determine whether to start data offload according to the bearer type; wherein the traffic offload network element is configured to start an offload policy for a bearer which is applied in local access to perform data offload and accomplish local access; and the traffic offload network element is further configured to transmit data on a bearer which is not applied in local access to the core network.

12. A system for indicating data offload, comprising:
a mobility management unit, configured to notify a bearer type of the bearer when a radio bearer is established or modified; and
a traffic offload network element, configured to receive a notification transmitted by the mobility management unit and determine whether to start data offload according to the bearer type; wherein the mobility management unit determines to provide local access function to a user according to the situation of subscription of the user or the situation of network load.

13. The system according to claim 12, wherein the traffic offload network element is further configured to start an offload policy for a bearer which is applied in local access to perform data offload, and transmit data on a bearer which is not applied in local access to the core network.

14. The method according to claim 8, wherein the base station comprises: a Home NodeB or a macro base station.

15. The method according to claim 1, wherein the mobility management unit includes: a mobility management entity (MME) or a serving GPRS support node (SGSN).

16. The method according to claim 2, wherein the mobility management unit includes: a mobility management entity (MME) or a serving GPRS support node (SGSN).

17. The method according to claim 3, wherein the mobility management unit includes: a mobility management entity (MME) or a serving GPRS support node (SGSN).

* * * * *